(12) United States Patent
Johnson et al.

(10) Patent No.: US 6,820,039 B2
(45) Date of Patent: Nov. 16, 2004

(54) FACILITATING DEVICE UPKEEP

(75) Inventors: Steven M. Johnson, Eagle, ID (US); Fernando Bolanos, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 10/125,989

(22) Filed: Apr. 19, 2002

(65) Prior Publication Data

US 2003/0200057 A1 Oct. 23, 2003

(51) Int. Cl.$^7$ ............................ G06F 11/30; G03G 15/08
(52) U.S. Cl. ........................ 702/184; 702/182; 399/27; 399/49
(58) Field of Search ............................... 702/182, 183, 702/184; 709/217, 220, 224; 399/8, 10, 24, 27, 49; 347/19, 23; 358/406

(56) References Cited

U.S. PATENT DOCUMENTS

| | | | |
|---|---|---|---|
| 4,586,147 A | 4/1986 | Tadokoro | 364/550 |
| 4,742,483 A | 5/1988 | Morrell | 364/900 |
| 4,930,101 A | 5/1990 | Wong et al. | 364/900 |
| 5,666,585 A | 9/1997 | Nagira et al. | 399/10 |
| 5,787,278 A | 7/1998 | Barton et al. | 395/601 |
| 5,855,006 A * | 12/1998 | Huemoeller et al. | 705/9 |
| 5,907,830 A | 5/1999 | Engel et al. | 705/14 |
| 6,028,674 A | 2/2000 | Tognazzini | 358/1.13 |
| 6,193,426 B1 * | 2/2001 | Guillemin | 400/605 |
| 6,629,134 B2 * | 9/2003 | Hayward et al. | 709/217 |
| 6,687,634 B2 * | 2/2004 | Borg | 702/85 |
| 2001/0002552 A1 * | 6/2001 | Vinci | 73/753 |
| 2003/0090532 A1 * | 5/2003 | Piatt et al. | 347/5 |

* cited by examiner

Primary Examiner—John Barlow
Assistant Examiner—Meagan S Walling

(57) ABSTRACT

Apparatuses, methods, systems, and arrangements facilitate the upkeep of an electronic device. In certain described implementations, one or more analyses and/or determinations may be completed with regard to one or more replaceable issues. If the replaceable issue(s) are determined to be deficient (including potentially deficient), then the electronic device may produce one or more upkeep-related items to facilitate an operator's upkeep thereof. Exemplary replaceable issues may be related to consumable item(s), maintenance items(s), ability items(s), etc. Exemplary upkeep-related items may include order-related items, reports, etc. Exemplary order-related items may include order forms, discount coupons and codes, network address and information combinations, etc. In an exemplary described printing device implementation, a printing device is capable of determining that at least one consumable item or maintenance item is at or near a point of being exhausted or worn out and providing an order-related item that refers to the exhausted/worn out item.

50 Claims, 6 Drawing Sheets

FACILITATING DEVICE UPKEEP

TECHNICAL FIELD

This disclosure relates in general to the field of devices, and in particular, by way of example but not limitation, to facilitating the upkeep of electronic devices.

BACKGROUND

Printers, other computer peripherals, and electronic devices in general are increasingly utilized in commercial, educational, and entertainment environments by people and entities of varying levels of sophistication and organization. Many, if not most, of these electronic devices employ consumables that must be periodically replenished, and/or these electronic devices require periodic maintenance. For example, printers regularly require new ink cartridges, more paper, and other substitutable operational parts. Unfortunately, it can be difficult and/or time consuming merely to remain abreast of these and other upkeep issues. Moreover, it is an even greater challenge to know when, how, and what materials should be used to address and remedy the multitude of upkeep issues presented by electronic devices.

SUMMARY

Apparatuses, methods, systems, and arrangements facilitate the upkeep of an electronic device. In certain exemplary described implementations, one or more analyses and/or determinations may be completed with regard to one or more replaceable issues. If one or more replaceable issues are determined to be deficient (including potentially deficient), then the electronic device can produce one or more upkeep-related items to facilitate an operator's upkeep of the electronic device. In an exemplary described printing device implementation, a printing device is capable of (i) determining that at least one of a consumable item and a maintenance item is at or near a point of being exhausted or worn out and (ii) providing an order-related item that refers to the at least one of a consumable item and a maintenance item.

BRIEF DESCRIPTION OF THE DRAWINGS

In the Drawings, like numerals are used for like and/or corresponding features, aspects, and components of the various FIGS. 1A–6.

DETAILED DESCRIPTION

Figure 1A:
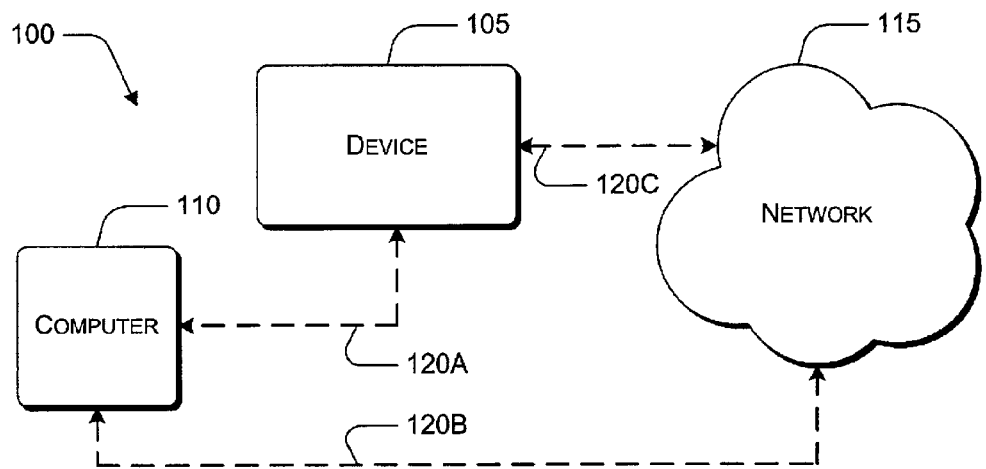
FIG. 1A illustrates a device in an exemplary environment with optional links to external communication points.

FIG. 1A illustrates a device in an exemplary environment with optional links to external communication points. The exemplary environment 100 includes a device 105. The device 105 may be a printing device, including a multifunction printing device; an imaging appliance in general; a digital camera; a personal digital assistant (PDA)/hand-held computer; or other electronic device that requires or may benefit from upkeep. Such upkeep may include replacing items that become exhausted, worn out, or outdated; performing preventive or necessary maintenance; extending or adding to existing abilities; and so forth. The exemplary environment 100 may also include one or more of many different types of external communication points. These external communication points may include, for example, a computer 110, a network 115, and so forth. The computer 110 may be, for example, a personal computer, a server computer, a set-top box, multiples or combinations thereof, and so forth. The network 115 may be, for example, a local/wide area network (LAN/WAN), a short-range wireless network (e.g., IEEE 802.11b, Bluetooth ®, etc.), the Internet, a wired/wireless telecommunications network, multiples or combinations thereof, and so forth.

The device 105 may optionally be connected to one or more of these external communication points over links 120A, 120B, and 120C. These links 120A, 120B, and 120C may be realized, for example, using wireline or wireless links, depending on user preference and the options available for the given device 105 and the targeted external communication point. For example, another computer or similar destination (not explicitly shown) may be attached to and/or be part of the network 115. The device 105 may be able to communicate with such a computer or similar destination over a first path via the link 120C and the network 115 and/or over a second path via the link 120A, the computer 110, the link 120B, and the network 115. For the second path, the device 105 may communicate with the computer or similar destination over the network 115 via, and by way of example only, a wireless Bluetooth ® link (120A), a personal computer (110), and a wireline link (120B) that uses a modem-compatible protocol over a public telecommunications line.

The device 105 may develop and/or otherwise be subject to a situation, condition, operation, and/or output, etc. that is sub-optimal and that may be remedied or at least improved. The device 105 may therefore develop a replaceable issue through standard functioning over time, through special functioning with respect to a given operator or operators, through becoming outdated due to external updates/upgrades becoming available, and so forth. A given replaceable issue may be addressed by remedying or at least improving the situation, condition, operation, and/or output, and so forth. The given replaceable issue may be remedied or at least improved in a myriad of manners depending on the replaceable issue, the device, the operator, and so forth. These manners may include, for example, installing an item, updating an item, performing maintenance, adding a feature, and so forth. These and other manners are described further throughout this application.

Each replaceable issue may be affected by or pertain to a replaceable item. In other words, a replaceable item may be associated with a replaceable issue under consideration if it affects or otherwise pertains to the given replaceable issue. Examples of replaceable items include consumable items, maintenance items, and ability items. These examples of replaceable items are further explained below with reference to FIG. 1B.

When a replaceable issue is determined to need to be addressed, the device may produce one or more upkeep-related items. Upkeep-related items may include, for example, order-related items, reports, and so forth. Order-related items may include, for example, order forms, discount coupons and codes, network address and information combinations, and so forth. Examples of order-related items are presented below with reference to FIG. 5A and in the description of FIG. 6, and an example of a report is presented below with reference to FIG. 5B. After being provided with upkeep-related item(s), an operator may utilize them, for example, to clean portions of the electronic device; to service parts of the electronic device; to update components of the electronic device; to install new, replenished, or additional replaceable item(s) into/onto the electronic device; and so forth.

Figure 1B:
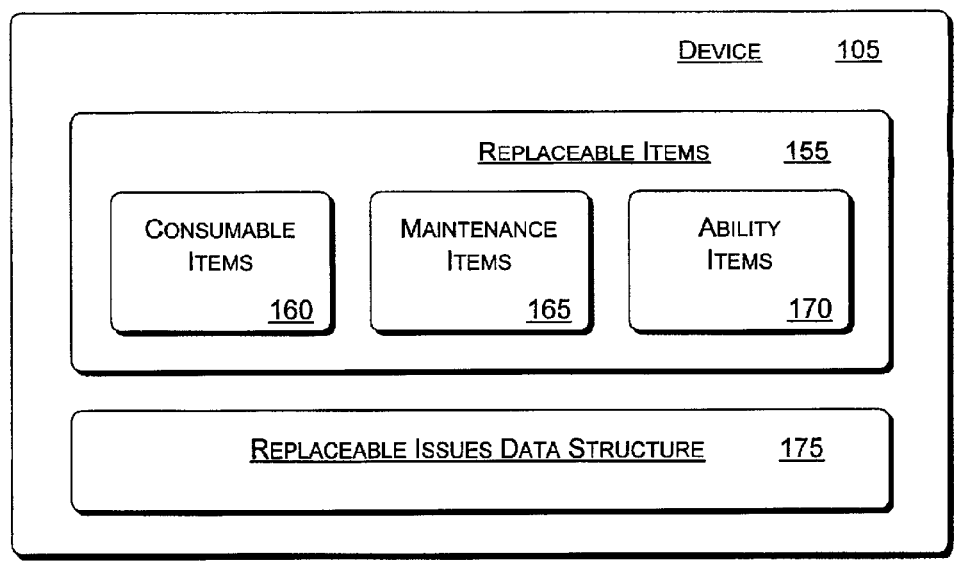
FIG. 1B illustrates a device showing exemplary replaceable items.

FIG. 1B illustrates a device showing exemplary replaceable items. The exemplary replaceable items 155 of the device 105 may include, but are not necessarily limited to, consumable items 160, maintenance items 165, and ability items 170. Consumable items 160 may include, for example, cartridges and other items that are exhausted on a relatively frequent basis (e.g., less than a few months, depending on usage patterns). Maintenance items 165 may include, for example, pick rollers, general rollers, fusers, print heads, transfer belts, print engines and other items that become worn out on a relatively infrequent basis (e.g., more than a few months, depending on usage patterns). It should be understood that usage patterns are relative and that a relatively frequently basis may alternatively correspond to, for example, a few hours while a relatively infrequent basis may alternatively correspond to, for example, several hours to a day. Ability items 170 may include, for example, software/firmware upgrades, memory upgrades, battery upgrades, link adapter upgrades, etc., as well as other items that improve the functioning of the device 105 as compared to a previous baseline.

The device 105 also shows an exemplary replaceable issue(s) data structure 175 that may be stored in any one or more of various memories (not shown in FIG. 1B) of the device 105. The replaceable issue(s) data structure 175 may be a table or other electronically-implementable organizational approach for storing data related to each relevant replaceable issue. A replaceable issue may be relevant in this context if there is an associated replaceable item, related instruction(s) for addressing or otherwise expressing a status of a replaceable issue, and so forth. Thus, each replaceable issue may have one or more entries in the replaceable issue(s) data structure 175.

Each entry of the replaceable issue(s) data structure 175 may store, for example, a name of the associated replaceable item, status and/or instructional information for reporting on/addressing the replaceable issue, a preferred manufacturer or other source for procuring the replaceable item, a corresponding replaceable indicator, and so forth. The replaceable indicator corresponding to the replaceable issue for the given entry may serve as way of identifying the associated replaceable item to, e.g., the preferred manufacturer or other source. The replaceable issue(s) data structure 175 is described further below, especially from an operational perspective, such as with reference to FIGS. 4 and 6. Replaceable indicators are also described further below, especially with reference to the exemplary order-related items of FIG. 5A.

Figure 2:
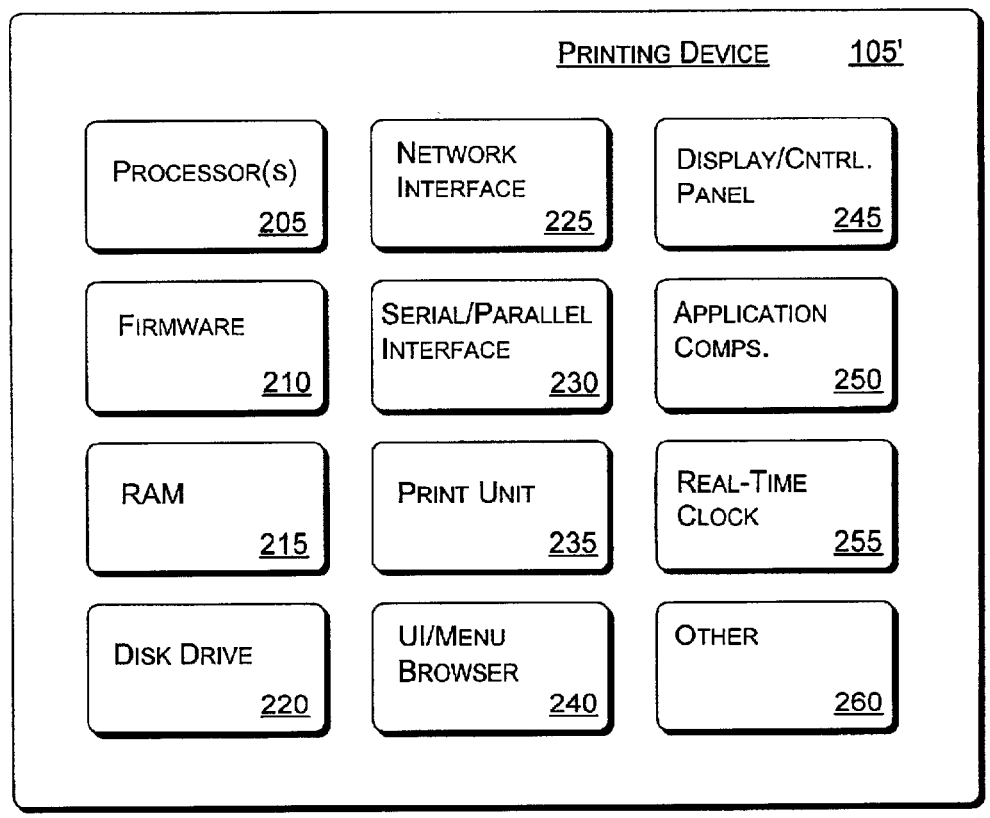
FIG. 2 illustrates an exemplary (e.g., multifunction) printing device showing various exemplary logical blocks and components.

FIG. 2 illustrates an exemplary (e.g., multifunction) printing device showing various exemplary logical blocks and components. A multifunction device, as the name implies, is a device capable of multiple functions which are related, but not necessarily limited, to one or more of the following functions: printing; copying; scanning, including image acquisition and text recognition; sending and receiving faxes; print media handling; and/or data communication, either by print media or e-media, such as via email or electronic fax. It should be noted that a printing device may (but need not necessarily) have other features in addition to printing, such as the aforementioned copying, scanning, faxing, and so forth. More generally, a multifunction device and/or a printing device may be considered an imaging appliance, which is an example of an electronic device that accepts, produces, and/or manipulates an image in electronic and/or hard copy form.

The printing device 105' of FIG. 2 (and FIG. 3 as described below) is an exemplary implementation of the device 105 (e.g., of FIGS. 1A and 1B), but at least portions of the descriptions of the printing device 105' may be relevant to other types of imaging appliances, as well as devices in general. The printing device 105' may include one or more processors 205, firmware 210, and a random access memory (RAM) 215. The printing device 105' may also include read-only (non-erasable) memory (ROM) (not explicitly shown) that stores, for example, boot-level/initialization code, basic identification and/or operational information, and so forth. The firmware 210 may be realized as, for example, ROM, programmable read-only memory (PROM), electrically programmable read-only memory (EPROM), electrically erasable programmable read-only memory (EEPROM), flash memory, and so forth. The printing device 105' may alternatively or additionally store (all or part of the) firmware 210 in a different type of writable or rewritable memory. It should be noted that if there are multiple such memory components, they may be integrated on a single chip, be on separate chips, and so forth. Furthermore, although not explicitly shown, a system bus or busses may connect and interconnect the various illustrated logical blocks and components of the printing device 105'.

The firmware 210 may be programmed and tested like software, and it may be distributed with the printing device 105'. It may also be additionally or alternatively updated after the printing device has been distributed to the user. The firmware 210 may be implemented to coordinate operations of the hardware within the printing device 105' when, for example, the firmware 210 stores programming constructs used to perform such operations.

The processor(s) 205 process various instructions to control the operation of the printing device 105' and optionally to communicate with other electronic and/or computing devices. The memory components (e.g., the firmware 210, the RAM 215, etc.) store various information and/or data such as configuration information, fonts, templates, translators, diagnostic plans, testing schemes, operational instructions, error/event log entries, print data, scanned image data, menu structure information, etc. depending on the functions provided by and being used with the printing device 105'.

The printing device 105' may also include a disk drive 220 (and/or a hard drive), a network interface (adapter) 225, and a serial and/or parallel interface (adapter) 230. The disk drive 220 provides additional storage for data being printed, copied, scanned, and/or faxed, or other information maintained by or for the printing device 105'. Although the printing device 105' is illustrated as having both the RAM 215 and the disk drive 220, a particular printing device 105' may alternatively include either a RAM 215 or a disk drive 220, depending on the storage needs of the printing device 105'. It should be understood that the disk drive 220 (as well as the RAM 215) may alternatively be substituted with or complemented by another removable and rewritable storage medium, such as a flash memory card, a removable hard drive, a proprietary format (e.g., a ZIP ® drive), and so forth.

The network interface 225 may provide a connection between the printing device 105' and a data communication network (or a specific device connected over a network-type medium). The network interface 225 allows devices coupled to a common data communication network to send print jobs, faxes, menu data, and other information to printing device 105' via the network. Similarly, the serial and/or parallel interface 230 may provide a data communication path directly between the printing device 105' and another electronic and/or computing device. Although the printing device 105' is illustrated as having the network interface 225 and the serial and/or parallel interface 230, a particular printing device 105' may only include one such interface component. It should also be understood that the printing device 105' may alternatively substitute or add another interface adapter type, such as a Universal Serial Bus (USB) interface adapter, an IEEE 1394 ("Firewire") interface adapter, a wireless interface (e.g., Bluetooth ®, IEEE 802.11b, wireless Local Area Network (LAN), etc.) adapter, and so forth.

The printing device 105' may also include a print unit 235 that includes mechanisms arranged to selectively apply pigment (e.g., liquid ink, toner ink, etc.) to a print media such as paper, plastic, fabric, and the like in accordance with print data corresponding to a print job. For example, the print unit 235 may include a laser printing mechanism that selectively causes toner ink to be applied from ink container(s) to an intermediate surface of a drum or belt. The intermediate surface can then be brought in the proximity of a print media in a manner that causes the toner to be transferred to the print media in a controlled fashion. The toner on the print media can then be more permanently fixed to the print media, for example, by selectively applying thermal energy to the toner. Alternatively, the print unit 235 may include an ink jet printing mechanism that selectively causes liquid ink to be extracted from ink container(s) and ejected through nozzles onto print media to form an intended pattern (e.g., text, pictures, etc.).

The print unit 235 may also be designed or configured to support duplex printing, for example, by selectively flipping or turning the print media as required to print on both sides. There are many different types of print units available, and the print unit 235 may be composed of any one or more of these different types. The printing device 105' may also optionally include a scanning unit (not shown) that can be implemented as an optical scanner to produce machine-readable image data signals that are representative of a scanned image, such as a photograph or a page of printed text. The image data signals produced by such a scanning unit can be used to reproduce the scanned image on a display device, such as a computer monitor or print media (e.g., via the print unit 235).

The printing device 105' may also optionally include a user interface (UI) and/or menu browser 240 and a display and/or control panel 245. The UI and/or menu browser 240 allows a user of the printing device 105' to navigate the device's menu structure (if any). A display aspect of the display and/or control panel 245 may be a graphical and/or textual display (including a liquid crystal display (LCD), a cathode ray tube (CRT), a plasma, a video, etc. screen) that provides information regarding, e.g., the status of the printing device 105' and the current options available to a user through, e.g., a menu structure. A control aspect of the display and/or control panel 245, on the other hand, may be composed of indicators and/or a series of buttons, switches, or other selectable controls that are manipulated by a user of the printing device 105'.

The printing device 105' may, and typically does, include application components 250 that provide a runtime environment in which software applications or components can run or execute. There are many different types of available runtime environments, which facilitate the extensibility of the printing device 105' by allowing various interfaces to be defined that, in turn, allow the application components 250 to interact with the printing device 105'.

The printing device 105' may also include a real-time clock 255. The real-time clock 255 may be used, for example, to monitor time-based maintenance needs/suggestions, to verify warranty service availability, and so forth. Other logic blocks and components may also be part of the printing device 105', as indicated by the other block 260.

Figure 3:
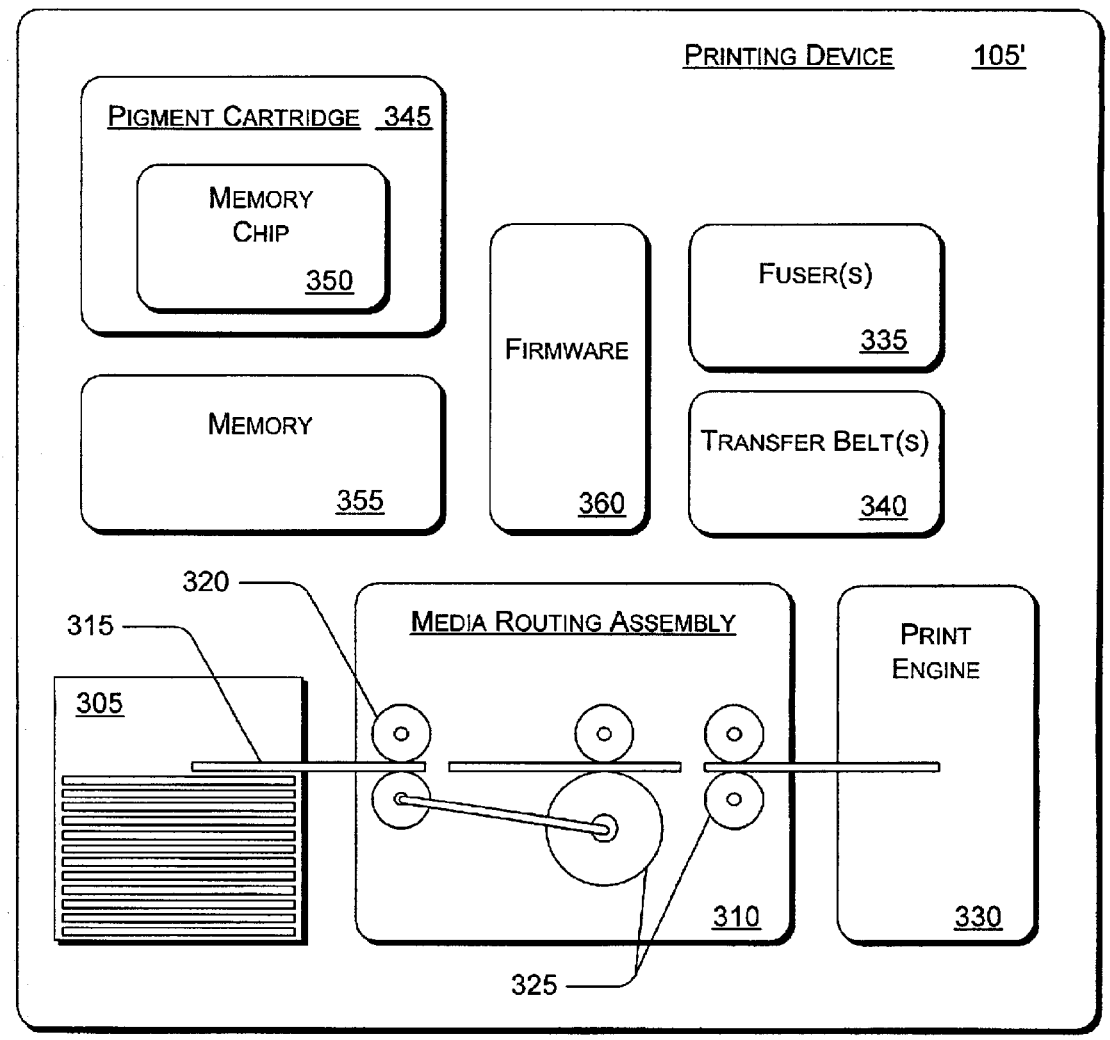
FIG. 3 illustrates exemplary replaceable items of an exemplary printing device.

FIG. 3 illustrates exemplary replaceable items of an exemplary printing device. The printing device 105' includes various item(s) that may be considered as consumable items 160, maintenance items 165, and/or ability items 170 (from FIG. 1B). It should be noted that differentiating replaceable items 155 into consumable items 160, maintenance items 165, and ability items 170 is a somewhat artificial and relativistic distinction that is intended to aid explanation. For example, the frequency of needed or recommended replacements of a consumable item 160 as compared to a maintenance item 165 varies by the nature of the item itself, as well as by the typical usage pattern of the operator of the device 105'.

The printing device 105' may include a paper supply container 305 and a media routing assembly 310 that work, typically in conjunction with one another, to feed paper 315 from the paper supply container 305 to the media routing assembly 310. A pick roller 320, which is shown within the media routing assembly 310, may actually extend onto/into the paper supply container 305 and/or may otherwise be pressed against the paper 315 while the paper 315 is still located fully or partially in the paper supply container 305. The pick roller 320 pulls the paper 315 toward or into the media routing assembly 310.

The media routing assembly 310 may also include general rollers 325 that serve to further propel the paper 315 toward, into, along, and/or through the media routing assembly 310, a print engine 330, and possibly other components (not explicitly shown) of the printing device 105'. It should be noted that the illustrated media routing assembly 310 may not be physically representative of any particular real-world media assembly 310, for it is provided for explanatory and conceptual purposes.

The print engine 330 is itself a component that may wear out after, for example, a predicted or expected number of printed pages. Other components of the printing device 105' that may need or may benefit from replacement after a period of time and/or use are fuser(s) 335, which serve to secure toner onto print media on laser printers, and transfer belt(s) 340, which are used during color printing.

An (other) example of a consumable item of the printing device 105' is a pigment cartridge 345. The pigment cartridge 345 may include multiple cartridges, especially if the printing device 105' prints in color as well as black. The pigment may be from, for example, liquid ink, toner ink (e.g., in a powder or similar form), and so forth. The pigment cartridge 345 may include a memory chip 350. The memory chip 350 may be formed, for example, from an actual integrated circuit (IC), from a magnetic strip, from a plastic film with (micro)electronic storage locations, and so forth. Information stored on the memory chip 350 may reflect or indicate the usable ink life left in the pigment cartridge 345. Such information may include, for example, an actual ink level in the pigment cartridge 345, an amount of ink that has been extracted from the pigment cartridge 345 (e.g., as a total ink volume, as a number of drops, etc.), a total original ink volume, a number of pages printed using the pigment cartridge 345, a number of roller rotations that have occurred since the pigment cartridge 345 was installed, some combination thereof, and so forth.

Memory 355 and firmware 360 are other components of the printing device 105' that may be considered as replaceable items (e.g., ability items). The memory 355 may be upgradeable by, for example, expansion via addition and/or substitution. The memory 355 may be composed of volatile (e.g., RAM) and/or non-volatile (e.g., Flash, EPROM, EEPROM, etc.) memory, for example. The memory 355 may be expandable by inserting a memory module into the printing device 105', possibly after removing a memory module with a smaller storage capacity if the expansion is being effectuated by substitution as opposed to addition. Improvement to the memory 355 may also be effectuated by, for example, substituting faster or more secure memory.

Similarly, firmware 360 may be upgradeable by, for example, expansion via addition and/or substitution. The firmware 360 may correspond to the firmware 210 (of FIG. 2) if the previous firmware 210 is being replaced or augmented. Alternatively, the firmware 360 may differ from the previous firmware 210 if the firmware 360 is to be operating along side and/or simultaneously with the previous firmware 210 (e.g., to implement new functionality that may be partially incompatible with the previous firmware 210). It should be understood that other replaceable items that are not illustrated in FIG. 3 may be part of and relevant to the printing device 105'. For example, the printing device 105' may be capable of accepting a two-sided printing assembly (by substitution or augmentation) to enable automated printing on two different sides of print media (e.g., to thereby reduce media usage by as much as 50%).

The text above that references FIG. 3 describes exemplary replaceable items of an exemplary printing device to illuminate some components for which upkeep may be facilitated. As noted above with reference to FIG. 1A, examples of other (electronic) device types in addition to printing devices include digital cameras, PDAs/hand-held computers, and so forth. These types of electronic devices may also have varied replaceable items such as memory component(s), battery(ies), link adapter(s), and so forth. As such, upkeep-related items produced by these types of electronic devices may also facilitate the upkeep thereof by their operators. These upkeep-related items may be produced after appropriate analyses and deficiency determinations for particular replaceable issue(s).

Appropriate analyses and deficiency determinations for particular replaceable issues are explained in significant detail below with reference to, for example, FIGS. 4 and 6. However, by way of a general introduction thereto and with respect especially to electronic devices such as digital cameras, PDAs/hand-held computers, and so forth, the following error/event log example is provided. To wit, an exemplary analysis and deficiency determination may be conducted by reviewing an error/event log (i.e., an error and/or an event log). Such a review may reveal, for example, a history of occurrences when a particular replaceable issue (e.g., a replaceable resource in the below instances) does not meet the needs and/or usage patterns of an operator. Three such exemplary error/event log instances are listed.

These three exemplary error/event log instances are as follows. First, tracking memory usage via an error/event log may lead to a conclusion that memory expansion can benefit the user. Second, tracking battery usage and (possibly deteriorating) battery life/recharging parameters via an error/event log may lead to a conclusion that replacing the battery can benefit the user. Third, tracking the frequency with which a user connects a wireless phone to the given electronic device via an error/event log may lead to a conclusion that installing a wireless link adapter can benefit the user. Thus, review of an error/event log, for example, may enable a conclusion that leads to production of one or more upkeep-related items, such as a report with recommendation(s) based on conclusion(s) drawn therefrom, an order-related item, and so forth. It should be understood that reviewing an error/event log may be applicable to upkeep of devices in general.

Figure 4:
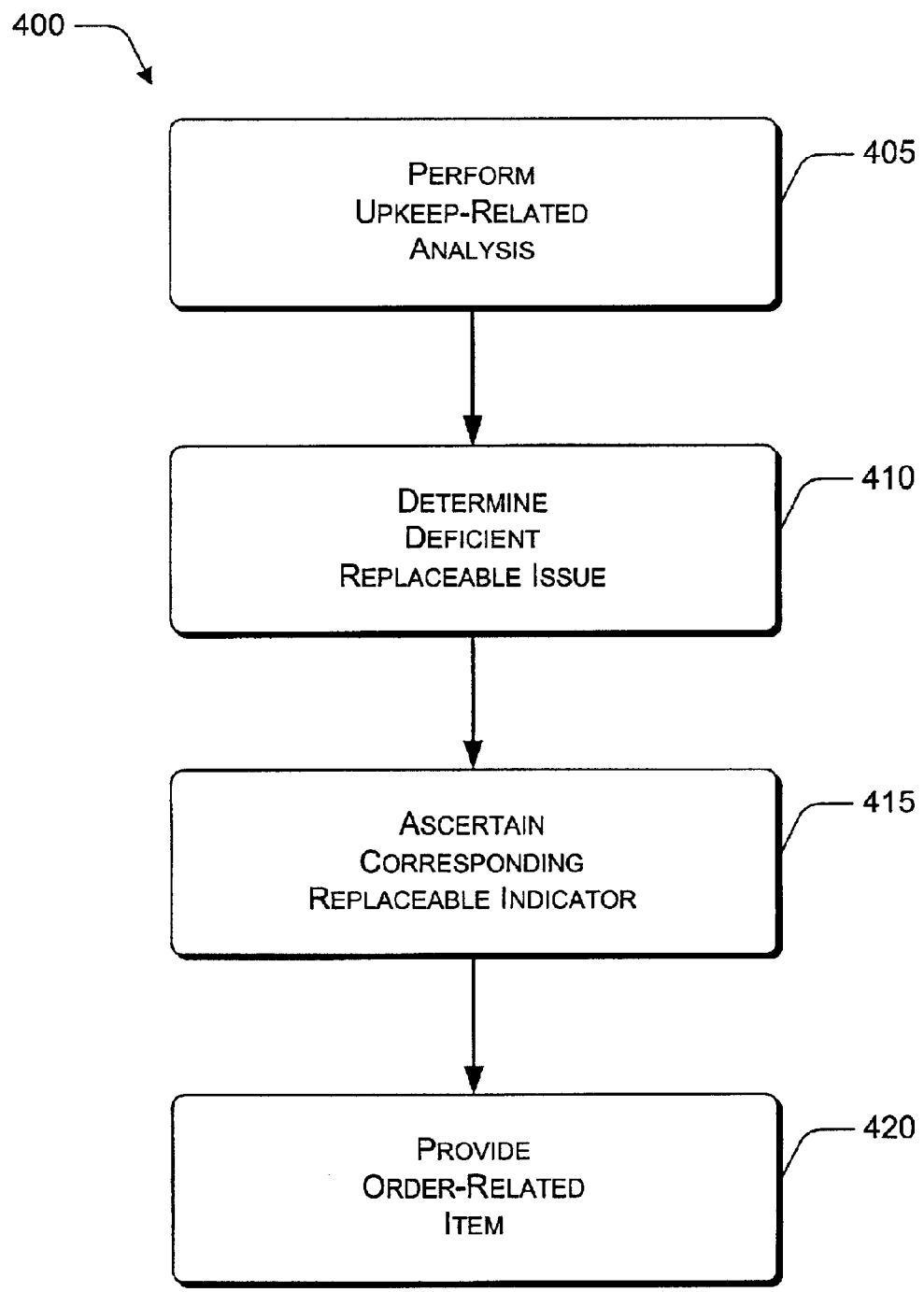
FIG. 4 illustrates an exemplary method in flowchart form for facilitating the upkeep of a device.

FIG. 4 illustrates an exemplary method in flowchart form for facilitating the upkeep of a device. All or parts of the flowchart 400 may be implemented by a device 105 (e.g., of FIGS. 1A and 1B) to facilitate the upkeep thereof by a user/operator. The device 105 may utilize one or more processors that execute instructions (and other information/data) stored in firmware or other memory of the device 105 when implementing any or all of the various actions 405–420 of the flowchart 400. Alternatively, at least parts of the flowchart 400 may be implemented by a computer 110 (of FIG. 1A).

With specific reference to the actions of FIG. 4, an action 405 comprises performing an upkeep-related analysis with respect to a particular replaceable issue. The analysis may vary depending on the particular replaceable issue under consideration. Any one or more of many different exemplary analyses may be performed. The exemplary analyses described in conjunction with the action 405 relate to counters, tests, error/event logs, diagnostics, and remainder indications. For an exemplary upkeep-related analysis that is performed in a printing device, a counter may be inspected, where the value of the counter reflects a number of pages that have been printed by the printing device. The value of the counter may be: a total number of pages since the printing device was set into operation, a number of pages since a most recent reset, a number of pages since a particular replaceable issue was addressed, and so forth.

There may be multiple (e.g., page) counters, with each replaceable issue therefore having one or more page counters of its own. Such replaceable-issue-specific counters may be reset each time a particular replaceable issue is addressed (e.g., remedied, ameliorated, etc.). Additionally or alternatively, there may be one global (e.g., page) counter for use in conjunction with numerical page value(s) of that global page counter that were recorded/stored for each particular replaceable issue when a particular replaceable issue was addressed. A current global page counter may be used in conjunction with stored numerical page value(s) for each particular replaceable issue by comparing the former to the latter to determine how many pages have been printed since the replaceable issue was most recently addressed.

These numerical page value(s) may include, for example, one numeral that records the page value of the global counter when a given replaceable issue was last addressed (as described in the preceding paragraph) and/or a numeral that stores a predicted page value of the global counter that predicts an expected global counter value at which the given replaceable issue will likely next need to be addressed. A history of the value of the global counter at each time that a particular replaceable issue is addressed may also be retained for ongoing analysis purposes. Although a page counter is disclosed as an example of a counter used within a printing device, other electronic devices may utilize different counters that increment in response to different events. These different events may include, for example, taking/storing a picture, making a connection over a link, and so forth.

Another example of an upkeep-related analysis is the execution of a test, such as attempting to perform a function or accomplish a task and then verifying that an expected or intended result is or is not achieved. An analysis may also include the reviewing of an error/event log, where the error/event log has recorded/stored a history of errors that have been detected and/or events that have occurred. Also, the device may engage in a diagnostic where the user is questioned with respect to a relevant replaceable issue. And alternatively or additionally, a remainder indication may be accessed by the device when conducting an upkeep-related analysis. For example, a memory chip of a pigment cartridge may be accessed to retrieve ink level/amount information. Furthermore, a software or firmware version analysis may be conducted by querying for current software and/or firmware version number(s).

Continuing now with the flowchart 400, an action 410 comprises determining whether or not a given replaceable issue is deficient. A replaceable issue may be considered deficient if, for example: (i) a consumable item is nearing exhaustion (e.g., at or within a given percentage of being consumed based on remaining substance level/amount or time in service), (ii) the replacement of a maintenance item is necessary or advisable because the device has or will soon fall below a predetermined standard of performance (and/or has already become non-functional) absent attention to the maintenance item (e.g., replacement of a component, cleaning of a component, etc.), (iii) an ability item may be added to update (e.g., because a later version or model is available) or otherwise to improve the device in a general sense or with respect to the particular usage patterns of the operator, (iv) some combination thereof, (v) and so forth.

Any one or more of many exemplary determinations with regard to potential deficiencies of replaceable issues may be effectuated. These exemplary determinations may optionally be selected responsive to any previously performed analyses. Thus, exemplary deficiency determinations described in conjunction with the action 410 may relate to counters, tests, error/event logs, diagnostics, and remainder indications. For example, a previously-acquired current counter value may be compared to a predetermined count level. If the current counter value exceeds the predetermined count level, for example with respect to a given replaceable issue, then that given replaceable issue may be considered as deficient. Alternatively, a replaceable issue may be considered deficient if the current counter value is within a predetermined percentage of a predetermined count level or within a predetermined number of incrementations of a predetermined count level.

Another example of a determination with regard to a potential deficiency of a replaceable issue is when the device (optionally in conjunction with a computer in communication therewith) is able to pinpoint a non-functioning part of itself based, wholly or partly, on a test performed during an analysis phase. Alternatively or additionally, log information from the error/event log may be correlated with at least one aspect of the device. For instance, if a particular recurring error is known to be caused or to likely be caused by a particular replaceable issue, then that replaceable issue may be considered as deficient or potentially deficient. Similarly, if a particular recurring event is known to indicate that an operator's efficiency and/or enjoyment may be improved with a change to a particular replaceable item of the device, then the associated replaceable issue may be considered as deficient.

As another deficiency determination example, a poor performance area may be verified based, at least partly, on a given diagnostic. In other words, but by way of example only, the device may ask an operator to appraise/critique an output or other function-related result of the device. If the operator is not satisfied with the output or other function-related result using an objective (e.g., comparison-based criterion or criteria) or a subjective determination, then the relevant replaceable issue(s) may be considered as deficient or potentially deficient. The device may also or alternatively compare an acquired remainder indication to a predetermined remainder amount when conducting a determination with regard to potential deficiencies of replaceable issues. For example, if the current value of the remainder indication falls at or below the predetermined remainder amount (or a threshold percentage or range in the vicinity thereof) with respect to a given replaceable issue, then that given replaceable issue may be considered as deficient. Furthermore, the device may compare an acquired current software/firmware version number to a latest software/firmware version number to determine whether the latest version is currently running. If the latest version is not currently running, then the software/firmware version may be considered as deficient.

Continuing now with the flowchart 400, an action 415 comprises ascertaining a replaceable indicator that corresponds to the replaceable issue. In other words, once one or more replaceable issues have been determined to be (actually or possibly) deficient (from block 410), then one or more replaceable indicators that correspond to each of the deficient replaceable issues may be ascertained. For example, a table may provide a correspondence between (i) each relevant analyzable and/or deficiency-determinable replaceable issue and (ii) one or more replaceable indicators. The table, or more generally a replaceable issues data structure 175, may be stored in a memory of the device 105 (as shown in FIG. 1B) or otherwise accessible thereto (e.g., via any one or more of the links 120A, 120B, and 120C (of FIG. 1A)). For example, if the replaceable issues data structure 175 is not stored in a memory of the device 105, then it may be stored in or over the network 115, on a CD-ROM (which may also store a program for facilitating device upkeep and/or a latest version of software/firmware) in the computer 110, and so forth.

For each relevant replaceable issue, the table includes one or more corresponding replaceable indicators. The replaceable indicator(s) may represent the replaceable item associated with the replaceable issue, where the replaceable item is expected to ameliorate, remedy, or otherwise affect the determined deficiency of the replaceable issue. Each replaceable indicator may be equivalent or similar to one or more of the following: a manufacturer's code number, a manufacturing model and/or serial number, a stock keeping unit (SKU), an ordering number specific to the manufacturer and/or one or more preferred suppliers, an alphanumeric value that an entity capable of providing the replaceable item recognizes, a software/firmware version number (possibly along with a name or other value corresponding to the software/firmware), some combination of the above, and so forth.

It should be noted that there may be no replaceable indicator for a replaceable issue. For example, a replaceable issue that pertains only to maintenance, such as cleaning a part of the device, may not need a physical replaceable item. On the other hand, the manufacturer of the device may wish to sell a particular cleaning solution or apparatus for use with the device; in this case, there may still be a replaceable item associated with the cleaning-related replaceable issue. A replaceable indicator corresponding to the cleaning-related replaceable issue may therefore be stored within the table.

An exemplary correspondence table, which may be realized more generally as any applicable data structure such as the replaceable issue(s) data structure 175 (of FIG 1B), may be stored in a permanent memory (e.g., ROM, etc.) or an alterable memory (e.g., EPROM, EEPROM, and/or flash memory, etc.) of the device. The table may be stored as part of the firmware, may be stored along with other instructions/information in the device, may be located elsewhere in the device, may be stored away from the device, and so forth. If the table is accessible to the device over the network 115 (of FIG. 1A), then the device may include instructions for accessing the table "directly" via the link 120C and/or "indirectly" via the link 120A, the computer 110, and the link 120B, depending on the options available to the device. Thus, at each entry for a relevant replaceable issue in a table, the device can ascertain from the table one or more replaceable indicators corresponding to that replaceable issue.

Continuing now with the flowchart 400, an action 420 comprises providing one or more order-related items. The order-related items may be, for example, order forms, discount coupons and codes, network address and information combinations, and so forth. Details of exemplary order-related items are presented below with reference to FIG. 5A and in the description of FIG. 6. The order related item(s) may be provided by the device in one or more of a myriad of manners.

These myriad of manners for providing order-related item(s) include, for example, presenting order-related item(s) to an operator as one or more order-related documents. The order-related document(s) may be displayed on a screen of the device and/or of a computer in communication therewith. The order-related document(s) may also or alternatively be printed onto print media by the device (e.g., if the device has a printing function) and/or a printing device in communication therewith. On the other hand, the order-related item may instead (or additionally) take the form of a network address and information related to the replaceable issue. A network address and information related to the replaceable issue combination is described further below in the description of FIG. 6. Exemplary order-related documents are further described below with reference to FIG. 5A.

Figure 5:
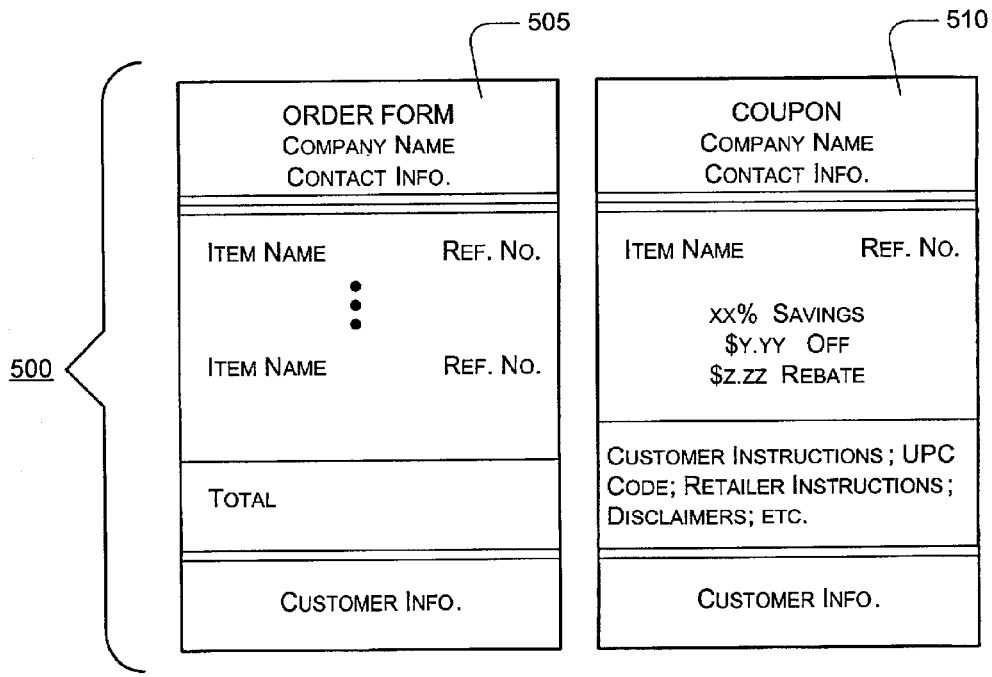
FIG. 5A illustrates first and second exemplary upkeep-related items.
FIG. 5B illustrates a third exemplary upkeep-related item.

FIG. 5A illustrates at 500 first and second exemplary upkeep-related items. Specifically, the first and second exemplary upkeep-related items 500 are exemplary order-related items that may be considered order-related documents. These exemplary order-related documents are an exemplary order form 505 and an exemplary discount coupon 510. Either or both of the order form 505 and the discount coupon 510 may be provided when a device provides order-related item(s) (e.g., as in action 420 of FIG. 4). When a device does provide both the order form 505 and the discount coupon 510, the device may include a code or other linkage between the two order-related documents.

The order form 505 may list one or more elements of a replaceable issue that has been determined to be deficient. The element(s) typically include a replaceable indicator and may include a name of the replaceable item, especially if desired for user/operator clarification purposes. In the order form 505, there are shown multiple order pairs, each with an item name (e.g., one example of a name of a replaceable item) and a reference number (e.g., one example of a replaceable indicator). The number of item name/reference number pairs may correspond to the number of relevant replaceable issues that were determined to be (or potentially to be) deficient. Although not shown, the order form 505 may include check boxes or similar so that the user/operator may select only certain item(s) for ordering while declining to order other item(s).

The order form 505 may also include the name of the company to which the order will be transmitted (possibly the manufacturer of the device) and the appropriate contact information (e.g., postal address, fax number, e-mail address, etc.) to which the operator can transmit the order form 505. Optionally, the order form 505 may include other data typically found on an order form, invoice, or similar, such as the price of each item, a total cost, customer information (which may be available from a memory of the device or externally), and so forth. The information included on the order form 505 may be extracted from, for example, the replaceable issue(s) data structure 175 (of FIG. 1B) or another memory location, including those accessible only via a link 120 (of FIG. 1A).

The replaceable issue(s) data structure 175 may also hold data for the discount coupon 510, such as a company name and contact information. The discount coupon 510 may apply to one or more different item name/reference number pairs, and may recite either or both the item name and the reference number. The discount may be in terms of, for example, a percentage savings, a specified number of dollars off, a specified number of dollars available by rebate, one or more of these terms, and so forth. If multiple different item name/reference number pairs are listed, then a different discount and/or discount term may be offered for each different pair.

The discount coupon 510 may be usable in any one or more of a number of different distribution channels, including but not limited to, a retail outlet, a mail-order distributor, the manufacturer of the device, and so forth. To that end, various additional data may or may not be included on the discount coupon 510 as appropriate, such as instructions/explanations for the operator/customer, a universal product code (UPC), instructions for a retailer, disclaimers, information about the customer, and so forth.

FIG. 5B illustrates a third exemplary upkeep-related item. Specifically, the third exemplary upkeep-related item is an exemplary report 550. The exemplary report 550 may be provided by a device along with or instead of an order-related item. The report 550 may inform an operator of the status of one or more replaceable issues of the device.

In a printing device, for example, one or more replaceable items (e.g., replaceables A–H of the report 550) may be listed with notification(s). These notification(s) for a printing device may include, for example, when the replaceable item was most recently changed (or otherwise addressed such as by cleaning, updating, etc.) and when the replaceable item is next due to be changed in terms of number of operations performed or to be performed (e.g., in units of number of pages printed). Thus, the useful life of some replaceable items in a printing device may be defined in terms of the number of pages printed or to be printed.

For devices in general, useful life of replaceable items may depend more on time. Consequently, replaceable items that depend more on elapsed time and/or the date since initial use for an assessment of their useful life may be listed with different notification(s). These notifications may include, for example, a date on which (or an elapsed time since) the replaceable item was changed and a due date for when (or a time period until) the replaceable item is next due to be changed. These notifications may also include whether (or not) a later software/firmware version is available. The replaceable items listed and the notification(s) thereof may be tailored to the specific electronic device and/or to the specific requests or peculiarities of the operator.

Other replaceable issues, besides those necessarily associated with replaceable items, may likewise be listed on the report 550. The notification(s) conveyed for each may also be tailored to the specific electronic device and/or to the specific requests or peculiarities of the operator. Two exemplary replaceable issues are shown on the report 550. First, a recurring event that has been detected and the recommendation for ameliorating or remedying the situation, or otherwise improving the operator experience is shown. Second, a cause of an output problem that has been determined and the recommendation therefor is shown. The recommendation may be to clean, replace, update, etc. a component (i.e., one example of a replaceable item).

Figure 6:
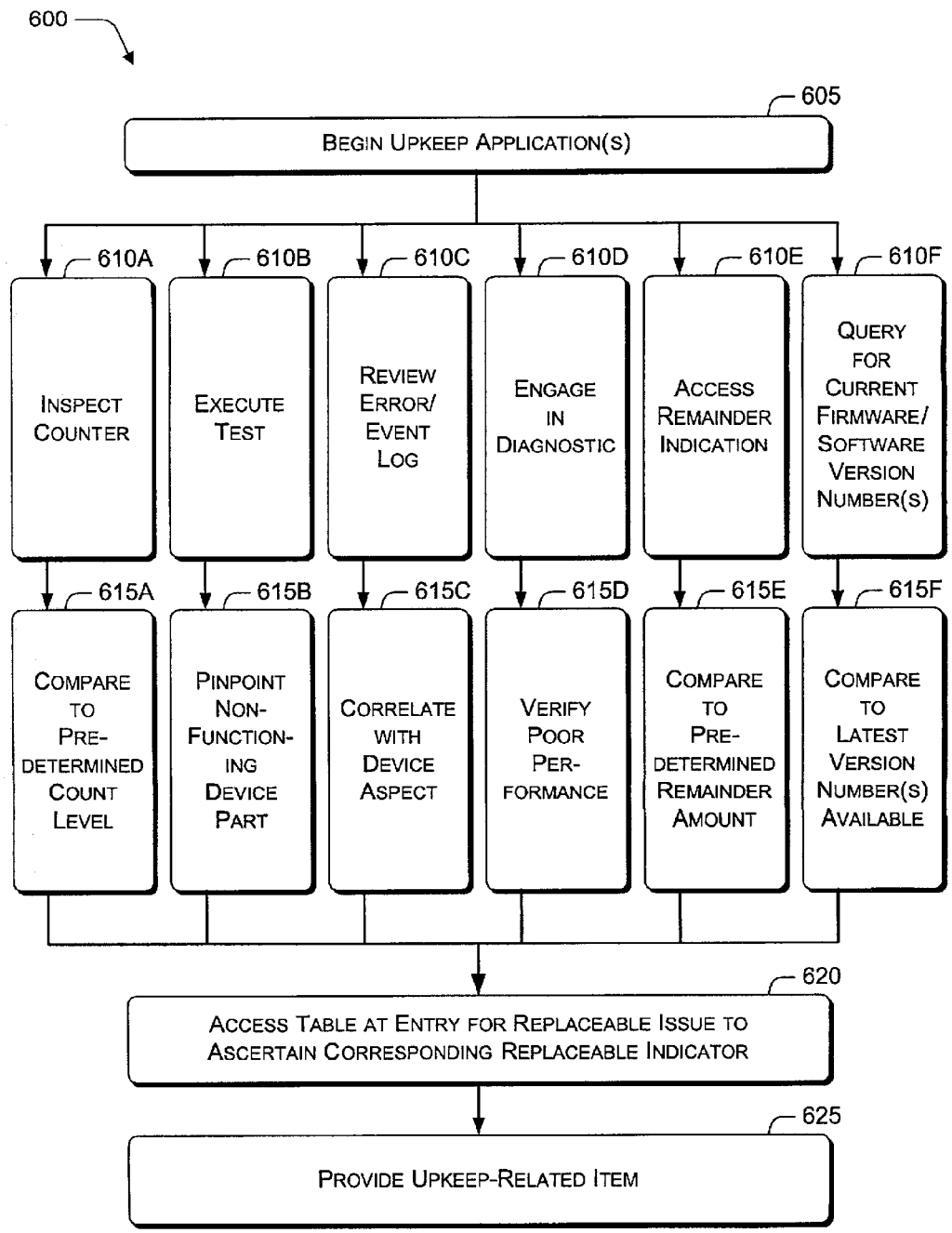
FIG. 6 illustrates another exemplary method in flowchart form for facilitating the upkeep of a device.

FIG. 6 illustrates another exemplary method in flowchart form for facilitating the upkeep of a device. While the flowchart 600 is applicable to electronic devices in general, the description below focuses on an exemplary printing device implementation. An action 605 comprises beginning one or more upkeep applications. The upkeep applications (e.g., programs, modules, executables, etc.) may be started in the (e.g., printing) device or a computer in communication therewith. The actions 610A–610F may correspond to, for example, an analysis phase of the upkeep application(s). The actions 615A–615E may correspond to, for example, a deficiency determination phase of the upkeep application(s). It should be noted that a given printing device need not be capable of all of the analyses and determinations shown. Also, even if a given printing device is capable of multiple or all of the analyses and determinations shown, then each analysis and determination need not be completed every time the upkeep application(s) are run. Furthermore, they may be started and/or completed at different times and in various orders.

With respect to actions 610A and 615A, a counter may be inspected by the printing device (block 610A). The counter may then be compared to a predetermined count level (block 615A). In an exemplary printing device, it may be known that pick rollers typically need replacement every 350,000 pages, that fusers typically need replacement every 400,000 pages, that pigment cartridges (e.g., containing laser printer toner) typically need replacement every 10,000 pages (or more, depending on the size of the cartridge), and that print engines typically need replacement every 800,000 pages (e.g., based on testing of a given model that provides an expected point of wearing out).

When the counter nears and/or exceeds a predetermined page level, then the relevant replaceable issue (e.g., relating to the pick roller, fuser, pigment cartridge, print head, print engine, etc.) may be considered deficient. A nearness level may be set depending on an average or customized (e.g., based on an observed usage pattern of the operator) prediction of pages printed per day and an expected number of days until a replacement may arrive after an order is sent. As described hereinabove, the printing device may have (i) a global counter with storage location(s) for the value of the global counter when a replaceable item is replaced, (ii) re-settable counters for each relevant replaceable issue, (iii) both re-settable counters and a global counter, and/or (iv) some other counter system.

With respect to actions 610B and 615B, a test may be executed by the printing device (block 610B). The printing device may then be able to pinpoint a non-functioning part of itself (block 615B). For example, the printing device may attempt to print a test page. If a no-pick jam occurs, then the printing device may consider the pick roller(s) to be deficient.

With respect to actions 610C and 615C, the error/event log may be reviewed (block 610C). Log information from the error/event log may then be correlated to aspects (e.g., physical, functional, etc.) of the printing device (block 615C). For example, if the log information includes repeated entries in which a print job was slowed or impossible to print because of memory constraints, then the memory of the printing device may be considered as deficient.

With respect to actions 610D and 615D, the printing device may engage in a diagnostic (block 610D). Using, for example, a dialogue with the operator, the printing device may be able to verify poor performance in one or more areas (block 615D). For instance, the printing device may be able to print two different test pages and ask the operator questions regarding their relative qualities. The printing device may be able to verify a poor performance area and the underlying (potentially deficient) replaceable issue responsible therefor. Alternatively, the printing device may be able to ask the operator if toner powder is contaminating its interior, e.g., if the printing device detects that a toner cartridge from a different manufacturer is being employed. If toner powder is contaminating the interior of the printing device, then the printing device may be able to consider the foreign toner cartridge as deficient and recommend that the operator employ a native toner cartridge (e.g., in a report). Also, noticing that (e.g., inferior) foreign replaceable items are in use may lead to the acceleration of recommendations for maintenance service and consumable item replacement.

With respect to actions 610E and 615E, the printing device may also or alternatively access a remainder indication (e.g., located on or accessible through the relevant replaceable item) (block 610E). The accessed remainder indication may be compared to a predetermined remainder amount (block 615E). When the accessed remainder indication nears or falls below a predetermined remainder amount, then the relevant replaceable issue may be considered as deficient. For example, a pigment cartridge may include a memory chip that stores a pigment level/amount and/or the pigment cartridge may include a measuring apparatus (e.g., an inductance-based apparatus for a liquid ink cartridge) for extracting a pigment level/amount. Again, a nearness factor may be set depending on an average or customized (e.g., based on an observed usage pattern of the operator) prediction of pigment used per day and an expected number of days until a replacement may arrive after an order is sent.

With respect to actions 610F and 615F, the printing device may be queried for current firmware and/or software (firmware/software) version number(s) (block 610F). The resulting current firmware/software version number(s) may be compared to version number(s) of the firmware/software that is or are the latest available (e.g., from the manufacturer) (block 615E). If the current firmware/software version number(s) are not as recent as the latest firmware/software version number(s), then the firmware/software version number replaceable issue may be considered as deficient.

With respect to an action 620, after one or more replaceable issues have been determined to be deficient (including potentially deficient) (from actions 615A–615F), then the printing device may access a table (or, more generally, a data structure) to read entries of the relevant replaceable issue(s) to ascertain corresponding replaceable indicator(s) (block 620). It should be noted that for execution of the action 615F, for example, the corresponding replaceable indicator(s), if not already otherwise known, may be ascertained from the table prior to any comparing. And with respect to an action 625, the printing device may provide an upkeep-related item using, for example, the data accessed from the table (block 625). The upkeep-related item may include firmware/software (e.g., from a CD-ROM, other external communication point, etc.), an order-related item, and/or a report. An exemplary report, including exemplary statuses, is described hereinabove with reference to FIG. 5B. It should be noted that a report may list a status of a particular replaceable issue as non-deficient (e.g., good, satisfactory, functioning normally, etc.). Two order-related items, an order form and a discount coupon, are described hereinabove with reference to FIG. 5A. Another exemplary order-related item is a network address and information combination. Instead of, or in addition to, presenting an order-related document, the printing (or other electronic) device may present a network address and information combination.

For a network address and information combination, the network address (e.g., a uniform resource locator (URL), an e-mail address, etc.) may serve to provide a communication avenue for the operator to contact the manufacturer or other preferred supplier of the relevant replaceable item. The operator may place an order by pointing a browser to the specified URL, by sending an e-mail to the specified e-mail address, by sending an electronic fax to a specified fax number, and so forth. It should be noted that the manufacturer and/or transmission destination of the order (whether in electronic or paper form) may be specified per replaceable issue or replaceable issue group, especially if one or more individual entries in the replaceable issue date structure include such information. The information portion of the network address and information combination type of order-related item may include one or more of the following: (i) replaceable indicator(s) corresponding to the relevant replaceable issue(s), (ii) discount code(s), (iii) name(s) of the replaceable item(s) associated with the replaceable issue (s), and (iv) so forth.

When the electronic device has a link, directly or indirectly, to the Internet, for example, the electronic device may transmit the network address and information portions of the network address and information combination simultaneously or sequentially. With such a link, the electronic device may be able to ascertain a corresponding replaceable indicator without storing a replaceable issues data structure within itself, for such a data structure may be accessed over the external network such as the Internet. The electronic device may also be able to use such a link to check for revision updates of its firmware and/or to instigate a remote firmware upgrade (RFU).

In addition to the analyses and deficiency determinations explained hereinabove, other ones may possibly be effectuated by a given electronic device. For example, especially (but not necessarily) using a link that provides Internet access, the electronic device can compare its own model and/or serial number, or those of installed replaceables, with model and/or serial numbers with known problems. Any matches may lead to a conclusion that the relevant replaceable issue(s) are deficient. Also, it may be determined that a warranty is about to expire based on a warranty period analysis. When the warranty is about to expire, the operator can be given the opportunity to extend the warranty for different periods of time. Furthermore, the content of the upkeep-related item(s) provided by the upkeep application (s) may be modified depending on whether the electronic device is in or out of warranty, which may be determined using a real-time clock of the electronic device.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A printing device adapted to facilitate its upkeep, comprising:

at least one processor; and at least one memory in electronic communication with the at least one processor, the at least one memory including a replaceable issues data structure in which each of a plurality of replaceable issues is associated with a replaceable indicator that addresses the corresponding replaceable issue;

wherein said at least one processor is programmed to effectuate actions comprising:

perform an upkeep-related analysis;

determine a replaceable issue that is deficient, based at least partly on the upkeep-related analysis;

ascertain a replaceable indicator that corresponds to the replaceable issue using said replaceable issues data structure; and provide an order-related item based on the replaceable indicator;

wherein said plurality of replaceable issues comprises consumable issues, maintenance issues and ability issues.

2. The printing device of claim 1, wherein the perform an upkeep-related analysis action comprises at least one of the following actions:

inspect a counter;

execute a test;

review an error/event log;

engage in a diagnostic;

access a remainder indication; and query for a current firmware/software version number.

3. The printing device of claim 2, wherein the determine a replaceable issue action comprises at least one of the following actions:

compare the counter to a predetermined count level;

pinpoint a non-functioning part of the printing device based, at least partly, on the test;

correlate log information from the error/event log with at least one aspect of the printing device;

verify a poor performance area based, at least partly, on the diagnostic;

compare the remainder indication to a predetermined remainder level/amount; and compare the current firmware/software version number to a latest firmware/software version number.

4. The printing device of claim 1, wherein the replaceable indicator identifies at least one replaceable item associated with the deficient replaceable issue.

5. The printing device of claim 4, wherein the at least one replaceable item comprises at least one of a pigment cartridge, a general roller, a memory, a transfer belt, a pick roller, a firmware/software application, a fuser, and a print engine.

6. The printing device of claim 1, wherein the provide an order-related item action comprises the following action:
present an order-related document using data included in said replaceable issues data structure in association with the replaceable indicator.

7. The printing device of claim 6, wherein the present an order-related document action comprises an action that prints the order-related document using the printing device.

8. The printing device of claim 6, wherein the present an order-related document action comprises an action that displays the order-related document on an electronic screen, wherein the electronic screen is integral with the printing device.

9. The printing device of claim 6, wherein the order-related document comprises an order discount item.

10. The printing device of claim 9, wherein the order discount item comprises at least one of a discount coupon and a discount code.

11. The printing device of claim 6, wherein the order-related documented comprises an order form.

12. The printing device of claim 1, wherein the provide an order-related item action comprises the following action:
present a network address and information combination.

13. The printing device of claim 12, wherein the network address comprises at least one of a uniform resource locator (URL) for the Internet and an e-mail address.

14. The printing device of claim 12, wherein the information comprises at least one of (i) at least one of the replaceable indicator and a name of a replaceable item associated with the replaceable issue and (ii) a discount code.

15. The printing device of claim 1, wherein the printing device is capable of performing at least one function selected from the group comprising: scanning, faxing, and copying.

16. An upkeep handling method for an electronic device, comprising:
performing an upkeep-related analysis;
determining a replaceable issue that is deficient based, at least partly, on the upkeep-related analysis; and
providing an upkeep-related item that refers to the deficient replaceable issue by using a replaceable issues data structure in which each of a plurality of replaceable issues is associated with an upkeep-related item that addresses the corresponding replaceable issue;
wherein said plurality of replaceable issues comprises consumable issues and maintenance issues.

17. The method of claim 16, wherein the action of providing an upkeep-related item comprises:
providing a report, the report listing a status of the replaceable issue.

18. The method of claim 17, wherein the status comprises a recommendation to an operator of the electronic device regarding the replaceable issue.

19. The method of claim 16, wherein the action of providing an upkeep-related item comprises:
providing an order-related item based on data taken from said replaceable issues data structure.

20. The method of claim 19, wherein providing an upkeep-related item further comprises providing an order discount item.

21. The method of claim 20, wherein the order discount item comprises a discount coupon or discount code.

22. The method of claim 16, wherein the electronic device comprises an imaging appliance, a digital camera, or a hand-held computer.

23. The method of claim 16, further comprising:
asking an operator of the electronic device whether a report, an order form, or both is/are desired; and
receiving an answer from the operator of the electronic device responsive to the action of asking an operator;
wherein the action of providing an upkeep-related item comprises providing the report, the order form, or both depending on the answer from the action of receiving an answer.

24. The method of claim 16, wherein the action of providing an upkeep-related item comprises:
providing at least one of a firmware and a software application having a version number that is more recent than a version currently in use.

25. An electronic device that facilitates upkeep, comprising:
performing means for performing an upkeep-related analysis;
determination means for determining a replaceable issue that is deficient based, at least partly, on the upkeep-related analysis;
ascertainment means for ascertaining a replaceable indicator that corresponds to the replaceable issue that is deficient using a replaceable issues data structure in which each of a plurality of replaceable issues is associated with a replaceable indicator that addresses the corresponding replaceable issue; and
provision means for providing an upkeep-related item based on the replaceable indicator.

26. The electronic device of claim 25, wherein the performing means comprises:
means for acquiring data as a result of the upkeep-related analysis; and
means for providing the data to the determination means.

27. The electronic device of claim 25, wherein the determination means comprises:
means for receiving data from the performing means; and
means for comparing the data to an expected or a predetermined value, level, number, or amount.

28. The electronic device of claim 25, wherein the ascertainment means comprises:
means for storing said replaceable issues data structure; and
means for accessing the replaceable issues data structure at an entry for the replaceable issue that is deficient and extracting therefrom the replaceable indicator that corresponds to the replaceable issue that is deficient.

29. The electronic device of claim 25, wherein the provision means comprises at least one of:
means for displaying the upkeep-related item; and
means for printing the upkeep-related item.

30. One or more electronically-accessible storage media, comprising information and electronically-executable instructions that, when executed by one or more processors, accomplish actions comprising:
perform an upkeep-related analysis;

determine a replaceable issue that is deficient based, at least partly, on the upkeep-related analysis; and provide an upkeep-related item based on the deficient replaceable issue by using a replaceable issues data structure in which each of a plurality of replaceable issues is associated with an upkeep-related item that addresses the corresponding replaceable issue.

31. A printing device adapted to facilitate its upkeep, comprising:

a print unit;

at least one processor; and at least one memory in electronic communication with the at least one processor, the at least one memory including:

a replaceable issues data structure, in which each of a plurality of replaceable issues is associated with a replaceable indicator that addresses the corresponding replaceable issue by identifying a replaceable item associated with the replaceable issue; and information for an order-related item.

32. The printing device of claim 31, wherein the data structure comprises at least a first entry and a second entry; the first entry including a first replaceable indicator that identifies a pigment cartridge, and the second entry including a second replaceable indicator that identifies a roller.

33. The printing device of claim 31, wherein the information comprises a format for an order-related document.

34. The printing device of claim 33, wherein the order-related document comprises at least one of an order form and an order discount item.

35. The printing device of claim 34, wherein the order discount item comprises at least one of a discount code and a discount coupon.

36. The printing device of claim 31, wherein the information comprises a name and contact information for at least one of a manufacturer, a distributor, and a retailer.

37. The printing device of claim 36, wherein the contact information comprises at least one of a network address, a postal address, a telephone number, and a fax number.

38. The printing device of claim 31, wherein the information is related to at least one entry in particular in the replaceable issues data structure, to the exclusion of at least one other entry of the replaceable issues data structure.

39. The printing device of claim 31, wherein the information comprises at least one of a network address and a discount code.

40. The printing device of claim 39, wherein the network address comprises at least one of an e-mail address and a uniform resource locater (URL).

41. A method for facilitating upkeep of a printing device, comprising:

procuring a variable, the variable relating to useful life of a replaceable item;

comparing the variable to a predetermined useful life variable of the replaceable item;

determining, responsive to the comparing, whether the replaceable item is in a state of deficiency;

if so, accessing a data structure at an entry pertaining to the replaceable item and extracting a replaceable indicator from the entry, the replaceable indicator representing the replaceable item; and printing an order-related item that includes the replaceable indicator.

42. The method of claim 41, wherein the action of determining, responsive to the comparing, whether the replaceable item is in a state of deficiency comprises:

determining that the replaceable item is in a state of deficiency when the variable is at or near the predetermined useful life variable of the replaceable item.

43. The method of claim 41, wherein the predetermined useful life variable of the replaceable item comprises at least one of a pigment level/amount and a number of pages printed.

44. A method of operating a printing device comprising:

printing two different test pages;

prompting a user for input on relative qualities of said two test pages; and identifying action needed to improve device performance based on said user input regarding said two test pages;

wherein the step of identifying action needed to improve device performance is performed by accessing a replaceable issues data structure in which a plurality of replaceable issues are each associated with a corrective action needed to improve device performance.

45. The method of claim 44, further comprising printing a report detailing said action needed to improve device performance.

46. The method of claim 44, further comprising providing an order form for materials needed for said action to improve device performance.

47. The method of claim 46, further comprising printing said order form.

48. The method of claim 46, further comprising providing a discount item for said materials.

49. A method of operating an electronic device comprising:

determining whether a component was made by an approved manufacturer;

if said component was not made by an approved manufacturer, recommending replacement of said component to a user; and prompting a user to input data related to performance of said component.

50. A method of operating an electronic device comprising:

determining whether a component was made by an approved manufacturer; and if said component was not made by an approved manufacturer, recommending replacement of said component to a user;

wherein said electronic device comprises a printing device, said component comprises a toner cartridge and said user is prompted to input an indication of toner leakage within said printing device.

* * * * *